March 20, 1973   G. W. IRWIN   3,721,545
MULTIPLE-CAVITY GLASS MOLD OPENING APPARATUS
Original Filed June 25, 1969   5 Sheets-Sheet 1

INVENTOR.
GEORGE W. IRWIN
ATTORNEYS

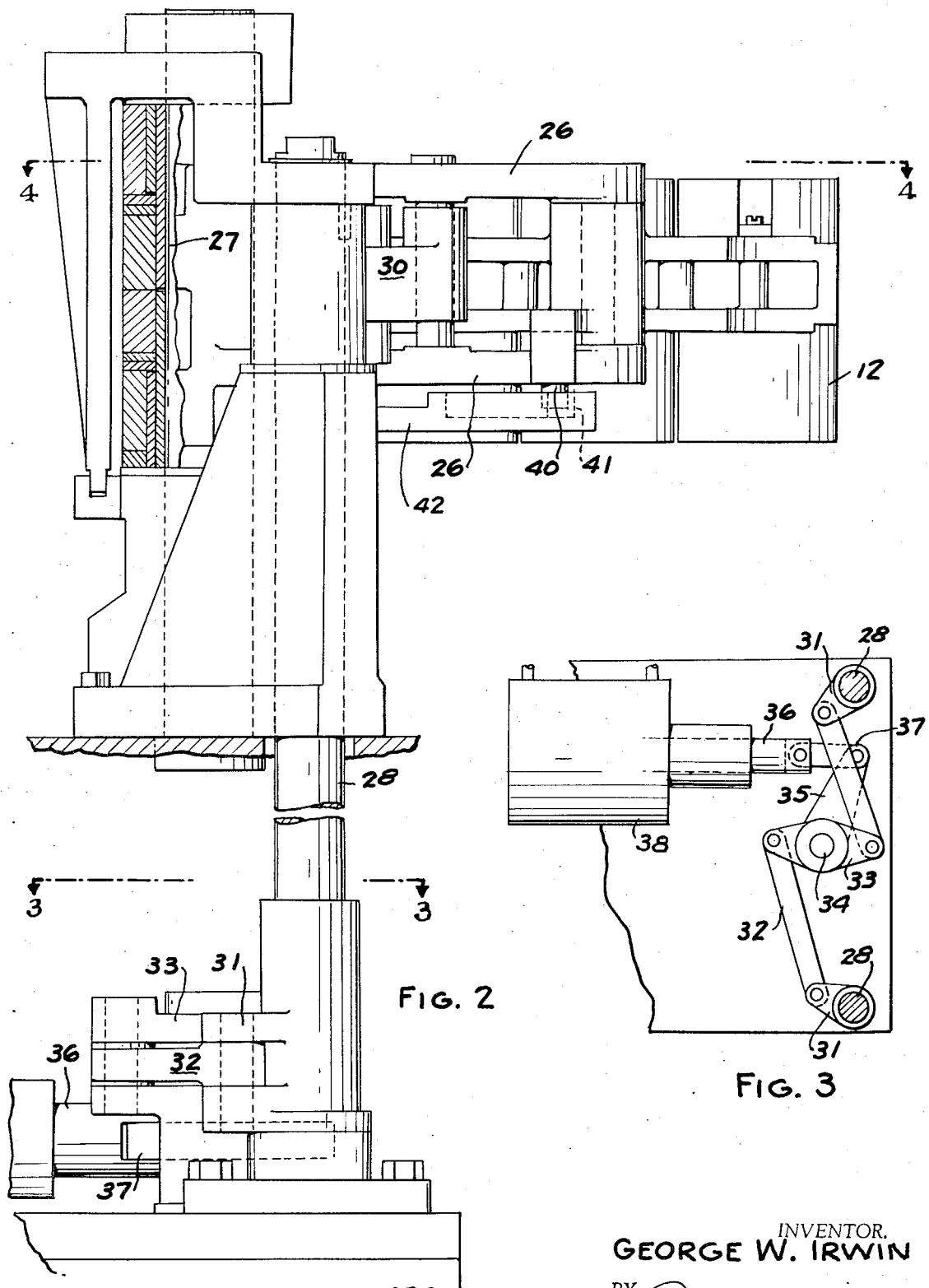

INVENTOR.
GEORGE W. IRWIN

BY
ATTORNEYS

United States Patent Office 3,721,545
Patented Mar. 20, 1973

3,721,545
MULTIPLE-CAVITY GLASS MOLD
OPENING APPARATUS
George W. Irwin, Holland, Ohio, assignor to
Owens-Illinois, Inc., Toledo, Ohio
Continuation of abandoned application Ser. No. 836,388,
June 25, 1969. This application Aug. 2, 1971, Ser.
No. 168,478
Int. Cl. C03b 9/40
U.S. Cl. 65—261                                14 Claims

ABSTRACT OF THE DISCLOSURE

A glass forming machine wherein a plurality of charges are formed into parisons at a parison molding station and thereafter transferred to a blow molding station where they are blown into shape. Means are provided for mounting the parison molds at the parison molding station in such a manner that they move away from one another a predetermined distance sufficient to provide clearance.

CROSS REFERENCE TO RELATED APPLICATION

This application is a continuation of application Ser. No. 836,388, filed June 25, 1969, now abandoned.

This invention relates to glass forming machines.

In one type of glass forming machine such as shown in the patent to Ingle, 1,911,119, a glass froming charge is delivered to a parison mold at a parison molding station, is shaped by pressing or blowing at the parison molding station to form a parison and thereafter the parison is inverted and transferred to a blow molding station where it is blown into shape. Where a plurality of charges are to be delivered to a plurality of parison molds at the parison molding station, considerable difficulty is achieved in providing proper clearances in order that sufficiently large articles can be produced on a machine of basically the same size as conventional machines.

Accordingly, among the objects of the invention are to provide a machine for forming glass articles wherein a plurality of charges can be formed readily at the parison molding station; wherein the machinery can be adapted to conventional machines; wherein sufficient clearance is provided for removal of the parisons after forming; and wherein clearances between various parts are readily achieved.

SUMMARY OF THE INVENTION

A glass forming machine wherein a plurality of charges are formed into parisons at a parison molding station and thereafter transferred to a blow molding station where they are blown into shape. Means are provided for mounting the parison molds at the parison molding station in such a manner that they move away from one another a predetermined distance sufficient to provide clearance. Each parison mold comprises a pair of mold halves. A plurality of mold halves are mounted on an insert and each insert is mounted on the arm. The arms are movable toward and away from one another and means are provided to move the inserts relative to the arms as the arms are swung outwardly to provide the desired clearance.

DESCRIPTION OF THE DRAWINGS

FIG. 2 is a part sectional fragmentary elevational view of a portion of the apparatus shown in FIG. 1.

FIG. 3 is a fragmentary sectional view taken along the line 3—3 in FIG. 2.

DESCRIPTION

Figure 1:
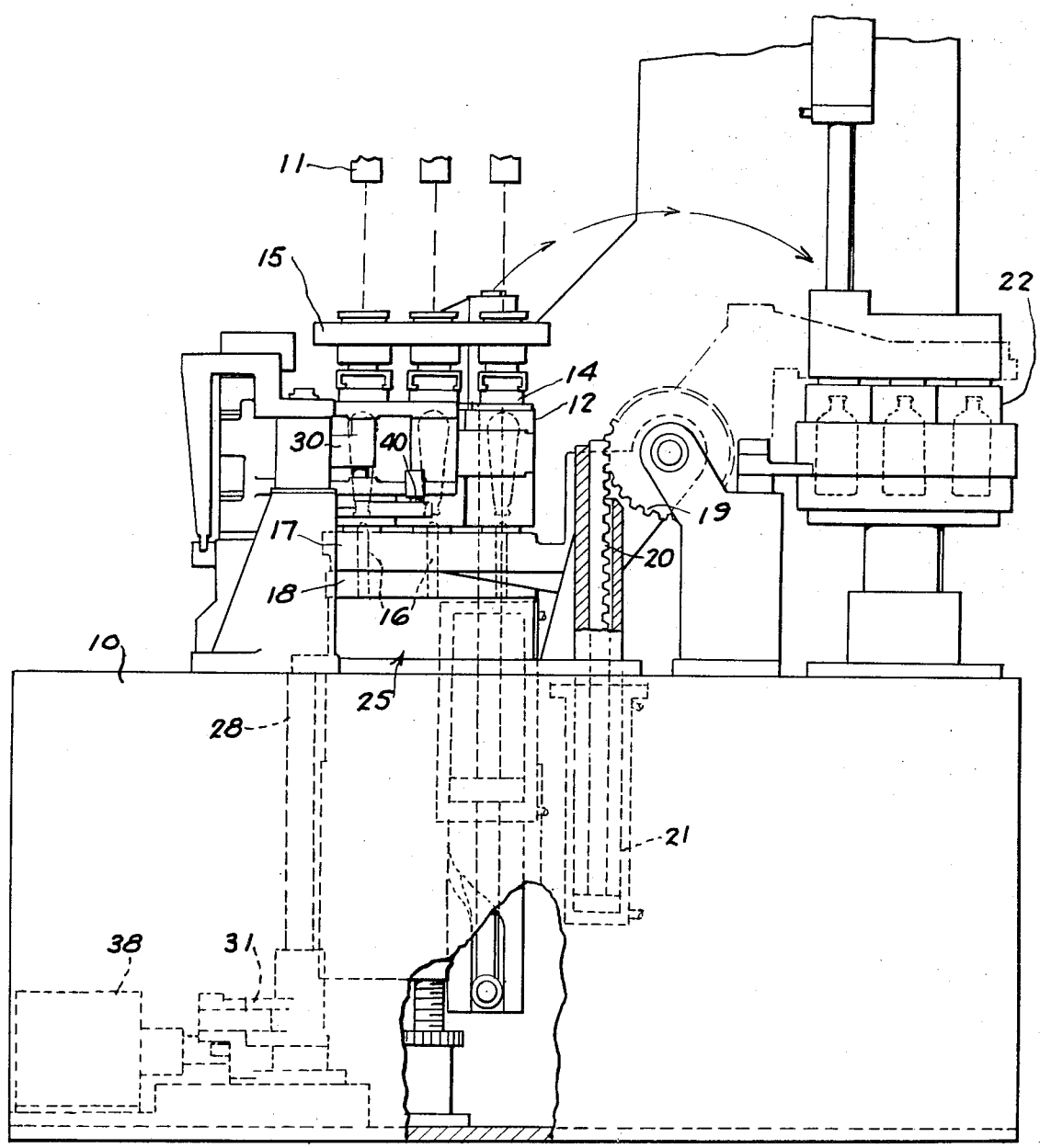
FIG. 1 is a partly diagrammatic elevational view of an apparatus embodying the invention.

Referring to FIG. 1, the apparatus embodying the invention includes a base 10 wherein a plurality of charges of molten glass are delivered by devices 11 to the cavities of a plurality of open ended parison molds 12, the upper ends of the cavities of which are closed by baffles 14 supported by baffle arms 15. The parisons are thereafter formed into charges by blowing through blow pipes 16 supported by the base structure 18. The formed parisons are thereafter transferred by the neck ring assembly 17 through a pinion 19 and rack 20 reciprocated by piston 21 to invert the parisons and bring them into position for blowing against the sides of blow molds 22 at a blow molding station.

Figure 4:
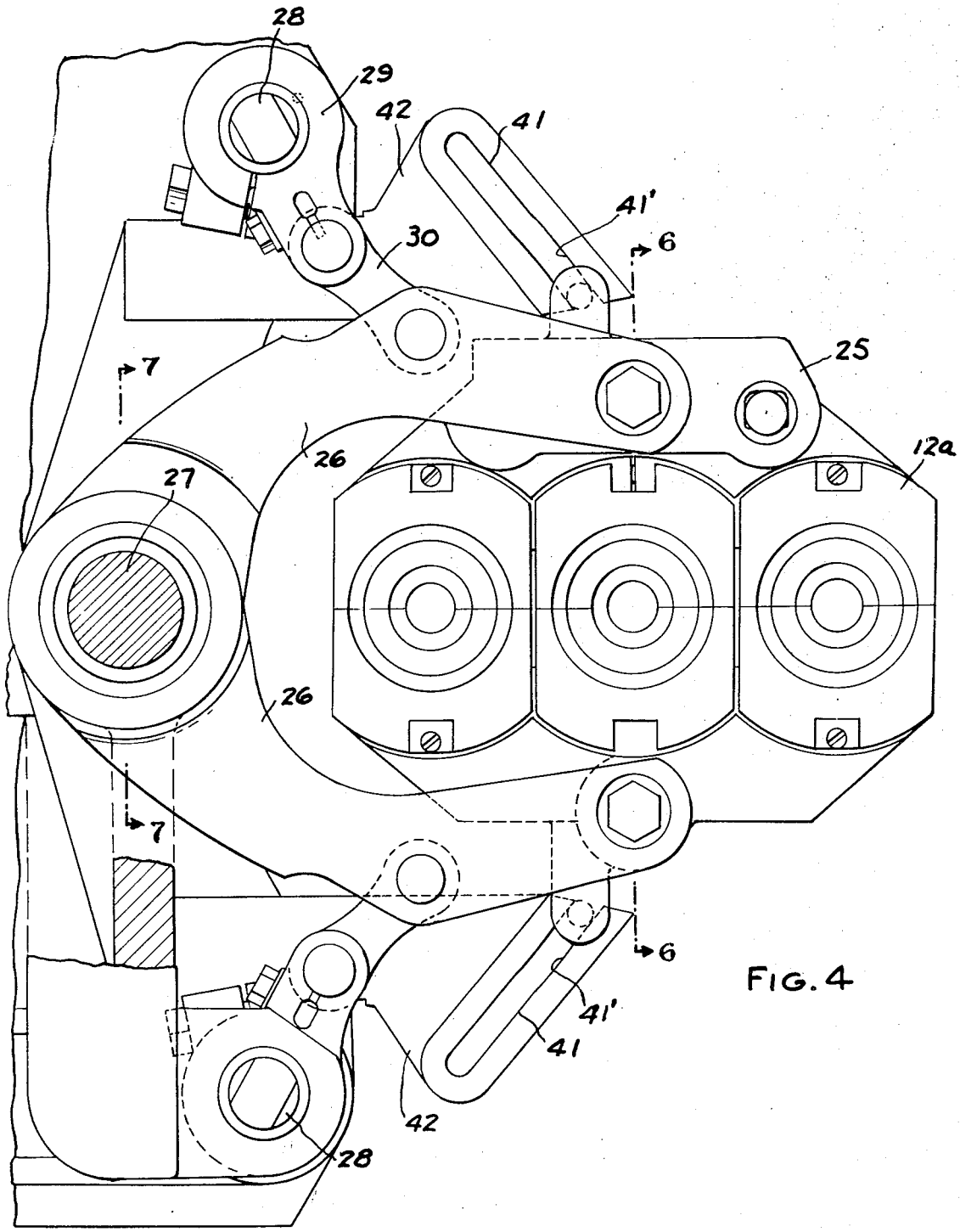
FIG. 4 is a fragmentary sectional view taken along the line 4—4 in FIG. 2.
Figure 5:
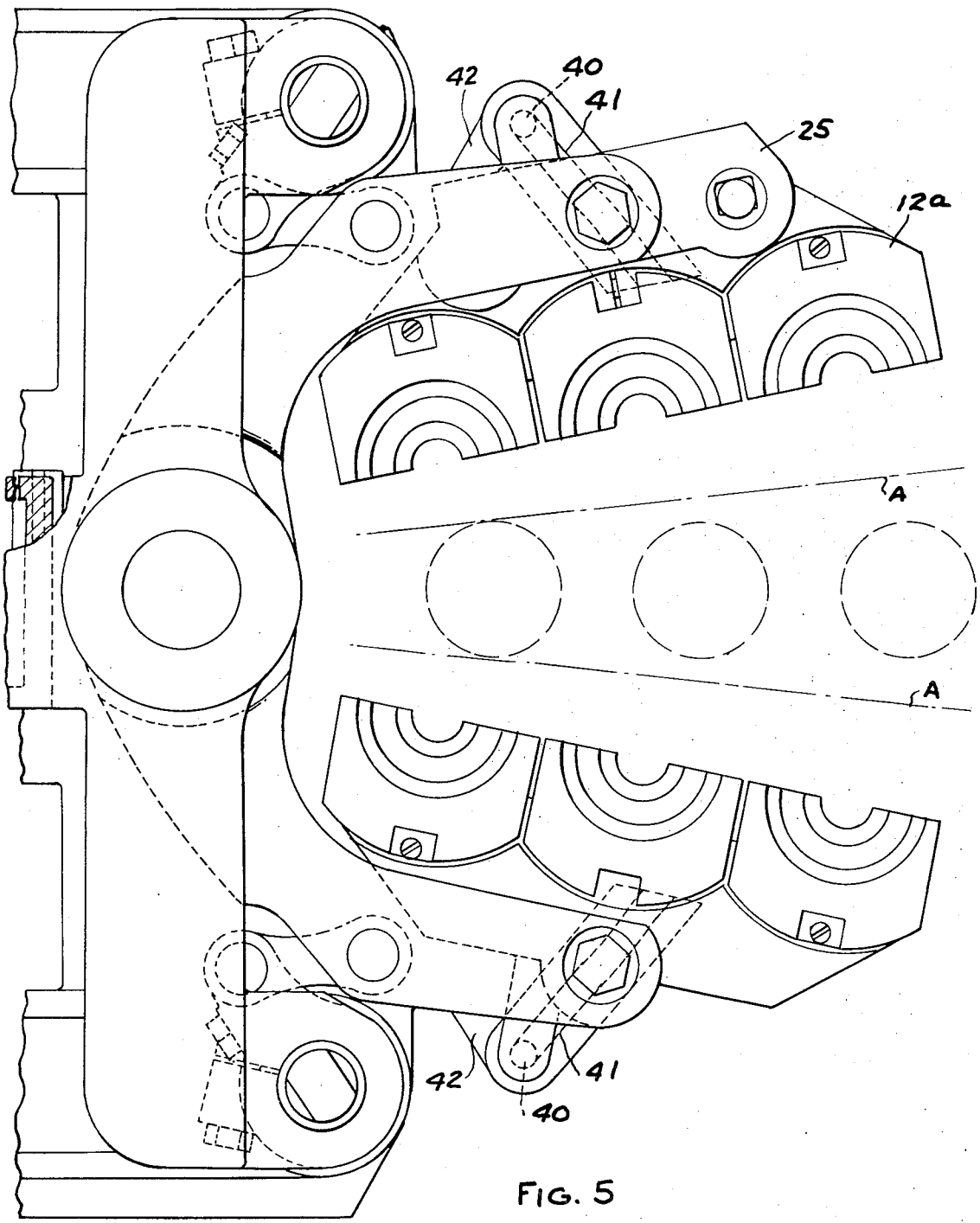
FIG. 5 is a view similar to FIG. 4 showing the parts in a different operative position.
Figure 6:
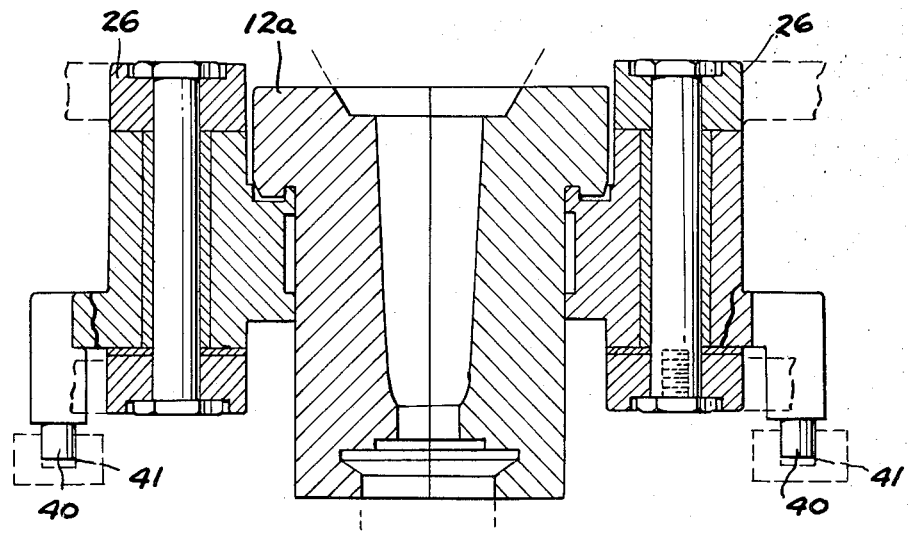
FIG. 6 is a fragmentary sectional view taken along the line 6—6 in FIG. 4.
Figure 7:
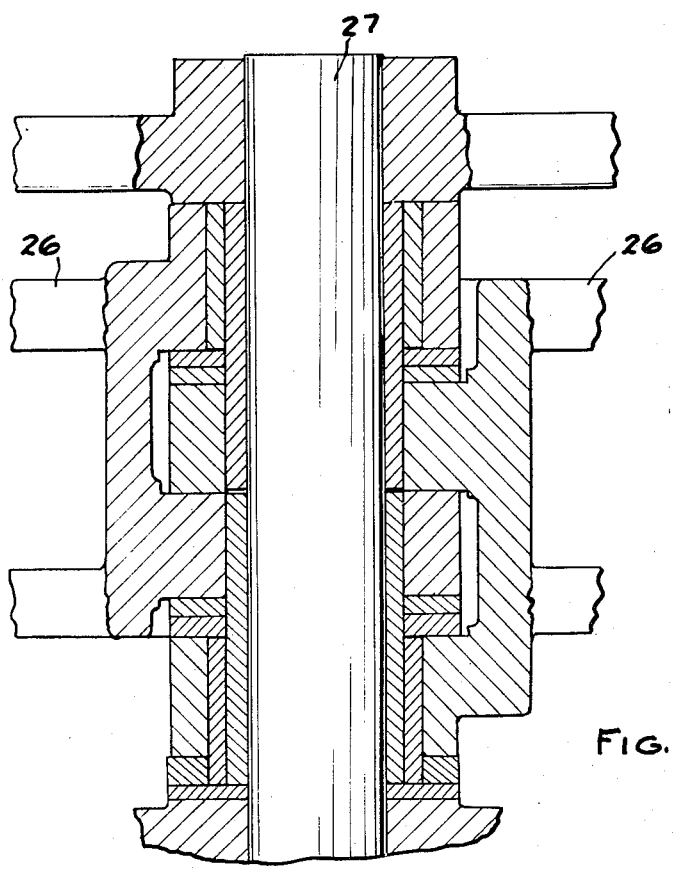
FIG. 7 is a fragmentary sectional view taken along the line 7—7 in FIG. 4.

Referring to FIGS. 4 and 5, in accordance with the invention each half 12a of a parison mold is supported on an insert 25 which is pivoted intermediate its ends to an arm 26. The arms 26 are pivoted about a common shaft 27. Means are provided for swinging the arms from a mold closing position such as shown in FIG. 4 to a mold opening position such as shown in FIG. 5 and comprise a shaft 28 individual to each said arm which can be oscillated, as presently described. A pivot member 29 is clamped to each oscillating shaft 28 and a lever 30 is pivoted at one end to the pivot member 29 and its other end intermediate the ends of its respective arm 26. By oscillation of the shafts 28, the arms 26 are moved between the positions shown in FIGS. 4 and 5.

As shown in FIG. 3, the apparatus for oscillating the shafts 28 comprises brackets 31 fixed to the shafts adjacent their lower ends and levers 32 pivoted to the brackets 31 at one end and to a bracket 33 on an idler shaft 34 at the other end. An opening arm 35 is fixed to the bracket 33 and connected to the piston 36 by a link 37 so that when the piston is reciprocated through operation of the cylinder 38 the various arms and the shafts 28 are oscillated.

As shown in FIGS. 4 and 5, each insert 25 is provided with a cam follower pin 40 that engages a cam slot 41 on a bracket 42 which is fixed with respect to the machine. The cam slots 41 are of identical configuration, except being mirror images of each other. Each cam slot has a curved portion 41' corresponding to an arc having the axis of pin 27 as its center. This curved portion extends from the forward or open end of each slot to a point, as shown in FIGS. 4 and 5, which corresponds to a mold opening position where the faces of the molds are at lines A, A of FIG. 5. From this point, to the closed ends of the slots, the slots are straight.

By this arrangement, when the arms 26 are swung outwardly due to oscillation of the shafts 28, they are moved to the position shown in FIG. 5. As the arms 26 are swung outwardly, inserts 25 swing outwardly initially to the angular position shown by broken line A and thereafter moved in a manner to maintain the insert at substantially the same angular position, that is in a direction substantially at a right angle to the line A, to the full open position shown in FIG. 5. Thus it can be seen that the arms 26 will move through a substantially greater arc than will the inserts 25 and the required separation distance of the molds and inserts will be sufficient to permit vertical movement of the neck mold arms and parisons to clear the mechanism during the invert motion without requiring the molds, arms or insert to be widely pivoted. Because of the compound motion through which the molds and inserts move, the mold halves which are closest to the pin 27 are adequately separated without having to swing the other molds through a wide arc to occupy space that is not presently available. Since it is not necessary to swing the mold arms 26 through as wide an angle as is presently required on the type of glass forming machine referred to previously, there is available more of the stroke of motor 38 for the application of clamping force to the molds when closed. The availability of this added stroke permits the present design of the drive 32–35 for the shafts 28 to be such that it has a greater mechanical advantage without requiring additional space and equipment and results in greater clamping force being applied through the shafts 28. Also because of the lesser swinging movement the linkage 29–30 between mold arms 26 and shaft 28 has been redesigned to shorten the arm 29 and lengthen arm 30 which results in a further increase in the closing force.

I claim:

1. In a glass forming apparatus wherein a plurality of charges of glass are delivered to parison molds at a parison forming station, are formed into parisons at the parison forming station and are thereafter transferred to a blow molding station where they are blown to shape, the combination comprising a base,
a pair of arms mounted on said base for swinging movement about a common axis of the blank forming station,
a pair of inserts,
means for movably supporting each insert on a respective support arm,
a plurality of mold halves mounted on each said insert,
a shaft individual to each said arm,
said shafts being positioned on opposite sides and forwardly of said common axis of said arms,
means interconnecting each said shaft and its respective arm for swinging said mold arms toward and away from one another to bring the inserts toward and away from one another and in turn close the mold halves into complementary relation to form mold cavities and move said mold halves out of position for removal of the parisons formed in the mold cavity,
interengaging cam and follower means on said base and each said insert for guiding said inserts in opening and closing movement of said mold halves such that upon initial opening movement of said arms the inserts are swung in an arc about said common axis to a predetermined angular position and upon further opening of said arms causing said inserts to move farther apart and rotate relative to the arms to maintain substantially the same predetermined angular position upon full opening of the mold halves.

2. The combination set forth in claim 1 wherein said cam comprises an elongated slot.

3. The combination set forth in claim 2 wherein said slot is curved in a first portion which engages the follower when the inserts are moved from closed position to said predetermined position and thereafter straight in that portion which engages the follower when the inserts are moved to fully open position.

4. The combination set forth in claim 3 wherein said curved portion of said slot extends generally circumferentially with respect to an arc having said common axis as its center.

5. The combination set forth in claim 1 wherein said means for swinging said arms comprises spaced shafts on said base,
a pivot member on each said shaft,
a lever pivoted to said pivot member and to its respective arm.

6. The combination set forth in claim 1 including means on said base for oscillating said shafts.

7. The combination set forth in claim 6 wherein said last-mentioned means comprises pivot members fixed to said shafts,
an idler shaft,
levers interconnecting said pivot members on said shafts and said idler shaft,
and means on said base for oscillating said idler shaft.

8. In a glass forming apparatus wherein a plurality of charges of glass are delivered to parison molds at a parison forming station, are formed into parisons at the parison forming station and are thereafter transferred to a blow molding station wherein they are blown to shape, the combination comprising a base,
a pair of mold arms mounted on said base for swinging movement about a common axis of the blank forming station,
a pair of inserts,
means mounting each insert on its respective arm for pivotal movement about a vertical axis relative thereto,
a plurality of mold halves mounted on each said insert in symmetrical relationship to said vertical axis,
an operating shaft individual to each said arm,
said shafts being positioned on opposite sides and forwardly of said common axis of said arms,
means interconnecting each said shaft and its respective arm for swinging said mold arms toward and away from one another to bring the inserts toward and away from one another and in turn close the mold halves into complementary relation to form mold cavities and move said mold halves out of position for removal of the parisons formed in the mold cavity,
interengaging cam and follower means on said base and each said insert for guiding said inserts in opening and closing movement of said mold halves such that upon initial opening movement of said arms the inserts are swung in an arc about said common axis to a predetermined angular position and upon further opening of said arms causing said inserts to move farther apart and rotate relative to the arms to maintain substantially the same predetermined angular position upon full opening of the mold halves with limited opening movement of said arms.

9. The combination set forth in claim 8 wherein said cam means comprises an elongated, upwardly opening slot mounted on said base.

10. The combination set forth in claim 9 wherein said slot is curved in a first portion which engages the follower when the inserts are moved from closed position to said predetermined position and thereafter straight in that portion which engages the follower when the inserts are moved to fully open position.

11. The combination set forth in claim 10 wherein said curved portion of said slot extends generally circumferentially with respect to an arc having said common axis as its center.

12. The combination set forth in claim 8 wherein said means for swinging said arms comprises spaced shafts on said base,
a pivot member on each said shaft,
a lever pivoted to said pivot member and to its respective arm.

13. The combination set forth in claim 8 including means on said base for oscillating said shafts.

14. The combination set forth in claim 13 wherein said last-mentioned means comprises pivot members fixed to said shafts,
- an idler shaft,
- levers interconnecting said pivot members on said shafts and said idler shaft,
- and means on said base for oscillating said idler shaft.

References Cited
UNITED STATES PATENTS 2,018,021 10/1935 Hoffmann ........... 65—360
2,018,785 10/1935 Harrison ........... 65—360

ARTHUR D. KELLOGG, Primary Examiner

U.S. Cl. X.R.

65—301, 360